(12) United States Patent
Gerdes et al.

(10) Patent No.: US 11,363,766 B2
(45) Date of Patent: Jun. 21, 2022

(54) SYSTEM, METHOD AND APPARATUS FOR PROVIDING CONSTANT PRESSURE WITHIN AN IRRIGATION SYSTEM AT REDUCED FLOW RATES

(71) Applicant: Valmont Industries, Inc., Omaha, NE (US)

(72) Inventors: Jerry Gerdes, Omaha, NE (US); John Kastl, Wahoo, NE (US)

(73) Assignee: Valmont Industries, Inc., Omaha, NE (US)

( * ) Notice: Subject to any disclaimer, the term of this patent is extended or adjusted under 35 U.S.C. 154(b) by 415 days.

(21) Appl. No.: 16/687,834

(22) Filed: Nov. 19, 2019

(65) Prior Publication Data

US 2020/0163292 A1 May 28, 2020

Related U.S. Application Data

(60) Provisional application No. 62/771,777, filed on Nov. 27, 2018.

(51) Int. Cl.
*A01G 25/16* (2006.01)
*B05B 12/08* (2006.01)
*A01G 25/02* (2006.01)

(52) U.S. Cl.
CPC ............ *A01G 25/16* (2013.01); *B05B 12/087* (2013.01); *A01G 25/02* (2013.01)

(58) Field of Classification Search
CPC ....... A01G 25/16; A01G 25/02; B05B 12/087
USPC .... 239/69, 726, 728, DIG. 15; 700/283, 284
See application file for complete search history.

(56) References Cited

U.S. PATENT DOCUMENTS

| | | | |
|---|---|---|---|
| 2002/0134868 A1* | 9/2002 | Hansen | A01G 25/16 239/69 |
| 2007/0267524 A1* | 11/2007 | Mack | A01G 25/092 239/69 |
| 2008/0046130 A1* | 2/2008 | Faivre | A01G 25/092 239/728 |
| 2012/0267447 A1* | 10/2012 | Abts | A01G 25/092 239/69 |
| 2015/0081120 A1* | 3/2015 | Pfrenger | G05B 15/02 239/728 |

* cited by examiner

*Primary Examiner* — Steven J Ganey
(74) *Attorney, Agent, or Firm* — Tilligan PC LLO (57) ABSTRACT

The present invention provides a system and method for maintaining desired pressure levels in an irrigation system when the flow rate available to the irrigation system is reduced below the system's required flow rate. According to a first preferred embodiment, the present invention teaches a method which includes the steps of: receiving and storing irrigation system information including sprinkler specifications, flow rates and pressure requirements; receiving and storing an irrigation plan to be executed including the target amount of an applicant to be applied to a target area; determining an available flow rate to the irrigation system; determining a required flow rate of the irrigation machine; comparing the available flow rate to the required flow rate to determine whether the available flow is sufficient for the system based on the sprinkler specifications; adjusting the pulse rate of the sprinklers to reduce the require flow rate to at least the available flow rate; and calculating and selecting a lower ground speed required to apply the target amount of applicant to the target area based on the selected pulse rate for the sprinklers.

19 Claims, 6 Drawing Sheets

SYSTEM, METHOD AND APPARATUS FOR PROVIDING CONSTANT PRESSURE WITHIN AN IRRIGATION SYSTEM AT REDUCED FLOW RATES

RELATED APPLICATIONS

The present application claims priority to U.S. Provisional Application No. 62/771,777 filed Nov. 27, 2018, which is hereby incorporated by reference herein.

BACKGROUND AND FIELD OF THE PRESENT INVENTION

Field of the Present Invention

The present invention relates generally to a system and method for controlling mechanized irrigation machines and, more particularly, to a system and method for providing constant pressure within an irrigation system at reduced flow rates.

Background of the Invention

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linearly and are fed with water from an outside source such as a well or water line. The essential function of an irrigation machine is to apply an applicant (i.e. water or other solution) to a given location.

The quantity or flowrate of water (or other applicant) supplied to an irrigation system may be limited or reduced below the optimal rate for the irrigation machine. This is often caused by issues such as: competing demands on a water supply; failure of a pump or well in a multi-source plumbing network; seasonal changes in water depth; and a variety of other reasons. Further, the flow demand from the irrigation machine may increase above the flowrate of water available from the water source. This is often seen on corner irrigation machines when the corner is extended into the corners of the field.

Flow demands in excess of application rates cause water pressure to drop within the machine and within the plumbing network supplying the irrigation machine. This limits the operating effectiveness of the irrigation system, reducing the actual application rate below the commanded application rate. Further, this reduction below the commanded application rate increases with the distance from the pivot point, thus affecting the uniformity of water application along the length of the machine. In extreme cases it is possible that one or more sprinklers near the end of the machine may not apply any water. Accordingly, modern irrigation systems operate poorly at flow rates and pressures below their design values. This is an important limitation when lower flow rates cannot be avoided.

SUMMARY OF THE PRESENT INVENTION

To address the shortcomings presented in the prior art, the present invention provides a system and method for maintaining a required minimum pressure level in an irrigation system receiving a reduced flow rate of applicant while also maintaining the target depth of an applicant. According to a first preferred embodiment, the present invention teaches a method which includes the steps of: receiving and storing irrigation system information including sprinkler specifications (such as irrigation depth at 100% speed), required sprinkler package flow rate and depth of an applicant; determining an available flow rate for the irrigation system; determining a required flow rate for the sprinklers; comparing the available flow rate to the required flow rate to determine whether the available flow rate is sufficient pressure; adjusting the pulse rate of the sprinklers to reduce the required flow rate needed to the available flow rate; and calculating and selecting a lower ground speed required to apply the target depth of applicant to the target area based on the selected pulse rate for the sprinklers.

According to a second preferred embodiment, the present invention teaches a method which includes the steps of: receiving and storing irrigation system information including sprinkler specifications, required sprinkler package flow rate and pressure requirements; receiving and storing an irrigation plan to be executed including the target depth of an applicant to be applied to a target area; determining an actual machine pressure for the irrigation system; determining a minimum required pressure for the sprinklers; comparing the actual pressure to the minimum required pressure to determine whether the available pressure is sufficient to meet the system's minimum required pressure; adjusting the pulse rate of the sprinklers to increase the actual pressure to meet or exceed the minimum required pressure; and calculating and selecting a lower ground speed required to apply the target depth of applicant to the target area based on the selected pulse rate for the sprinklers.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Figure 1:
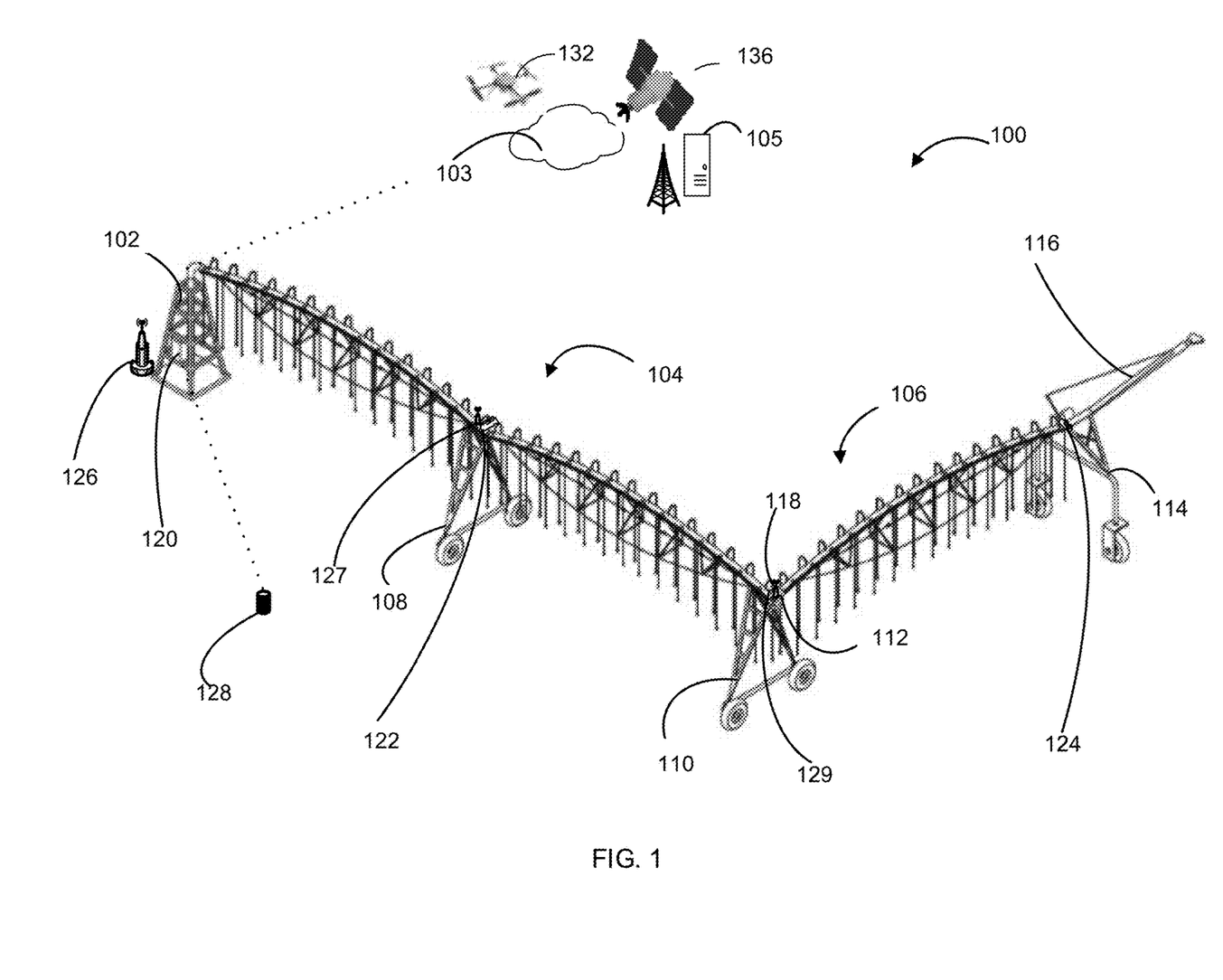
FIG. 1 shows an exemplary irrigation system for use with the present invention.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; corner systems) may be used with the present invention without limitation.

With reference now to FIG. 1, an exemplary irrigation machine 100 of the present invention preferably may include a main span 104, a center pivot structure 102 and supporting drive towers 108, 110. The exemplary irrigation machine 100 may also include a corner span 106 attached at a connection point 112. The corner span 106 may be supported and moved by a steerable drive unit 114. The corner span 106 may include a boom 116 and an end gun (not shown) and/or other sprayers. Additionally, a position sensor 118 may provide positional and angular orientation data for the system as discussed further below. Further, a central control panel 120 is provided for enclosing on-board computer elements such as elements of the exemplary control device 138 as discussed below. The control panel 120 may also be linked to a transceiver for transmitting and receiving data between system elements, device/internet clouds 103, remote servers 105 and/or the like. In accordance with a further aspect of the present invention, the control panel 120 may be further linked to a remote sensing element such as a sensor suite located on an aerial vehicle 132 (UAV/MAV), satellite 136 and other high-altitude monitoring systems.

Additionally, the system may include and/or receive data from sensors providing in-situ soil data 128 (e.g. moisture content) and/or crop related data. The system may also include image sensors 122, 124 which preferably may include sensors to indirectly determine the moisture levels in a given area of soil and/or optics to allow for the detection of crop type, stage of grown, health, presence of disease, rate of growth and the like. The system may also receive include a weather station 126 or the like to measure weather features such as humidity, pressure, precipitation, solar radiation, temperature and the like. Additionally, the system may include wireless transceivers/routers 127, 129 for receiving and transmitting signals between system elements. Preferably, the data collected by the detectors and sensors of the present invention are forwarded to a main control panel 120 and control device 121 as discussed further below. Alternatively, the received data may be collected and retransmitted to a remote server/cloud for processing and analysis.

Figure 2:
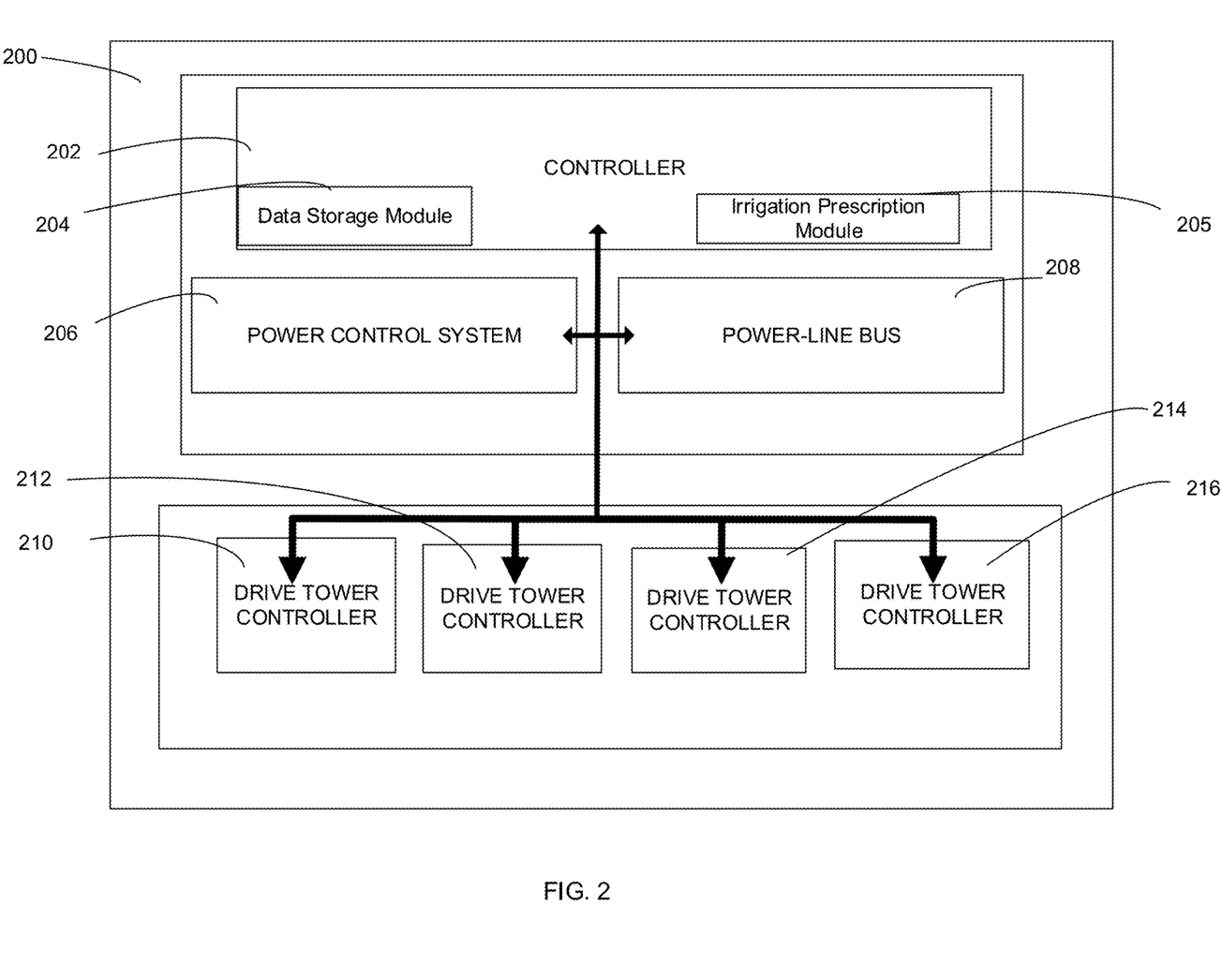
FIG. 2 shows a block diagram illustrating the exemplary processing architecture of a control device in accordance with a first preferred embodiment of the present invention.

With reference now to FIG. 2, an exemplary control device 200 which represents functionality to control one or more operational aspects of the irrigation system 100 will now be discussed. As shown, the exemplary control device 200 may preferably include a controller 202 which may include a data storage module 204 and an irrigation prescription module 205. The irrigation prescription module 205 is preferably software code and embedded logic which controls the application of applicants by the system as discussed further below.

The controller 202 preferably provides processing functionality for the control device 200 and may include any number of processors, micro-controllers, or other processing systems. The controller 202 may execute one or more software programs/modules that implement techniques described herein. The memory/data storage module 204 is an example of tangible computer-readable media that provides storage functionality to store various data associated with the operation of the control device 200, such as the software program and code segments mentioned above, or other data to instruct the controller 202 and other elements of the control device 200 to perform the steps described herein. The data storage module 204 may include, for example, removable and non-removable memory elements such as RAM, ROM, Flash (e.g., SD Card, mini-SD card, micro-SD Card), magnetic, optical, USB memory devices, and so forth.

In implementations, the exemplary control device 200 preferably further includes a power control system 206 and a power-line BUS 208 which may include conductive transmission lines, circuits and the like for controlling and routing electric power.

Although discussed with respect to a power line BUS 208, the system of the present invention may further and/or alternatively communicate with one or more networks through a variety of components such as wireless access points, transceivers and so forth, and any associated software employed by a variety of components (e.g., drivers, configuration software, and so on). As further shown, the control device 200 may be in communication with each drive tower controller 210, 212, 214, 216 to control movement of the irrigation system 100. Further, the control device 200 may preferably further include multiple inputs and outputs to receive data from sensors and other monitoring devices as discussed further below.

Figure 3:
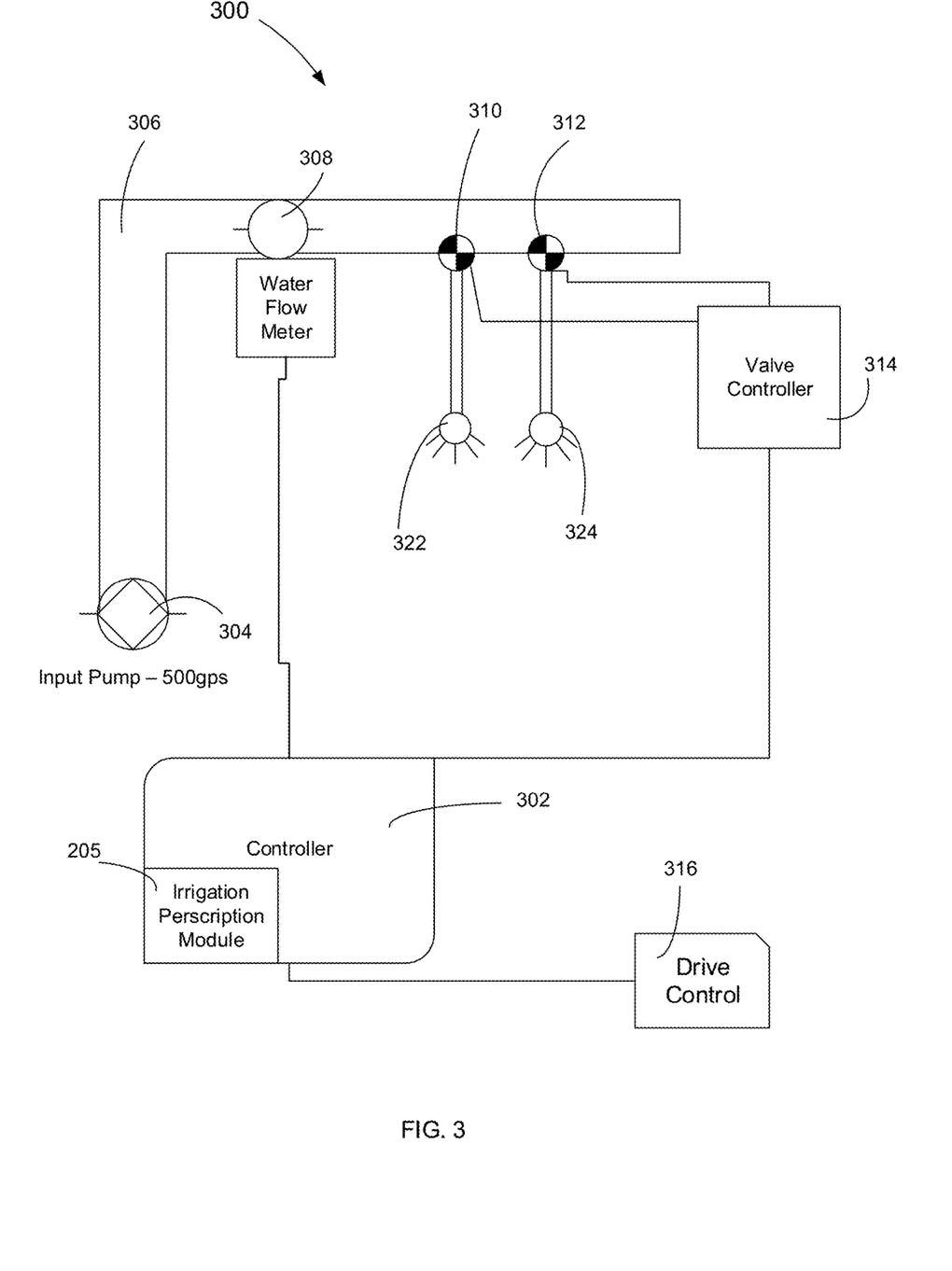
FIG. 3 shows a block diagram of a power and control system in accordance with a further preferred embodiment of the present invention.

With reference now to FIG. 3, further aspects of the present invention shall now be further discussed. As shown in FIG. 3, the system of the present invention 300 may preferably include an input pump 304 providing water (or another applicant) at given flow rate into the irrigation span 306 for delivery to selected sprinklers 322, 324. According to a preferred embodiment of the present invention, the inlet pump 304 is preferably programmed to run at a fixed flow rate, which may for example be 500 gpm.

As further shown in FIG. 3, a preferred system of the present invention may preferably further include a water flow meter 308 which may preferably provide a direct measurement of the water flow rate to the system controller 302. As discussed above, the controller 302 of the present invention may preferably include an irrigation prescription module 205. According to preferred embodiments of the present invention, the irrigation prescription module 205 may preferably receive pump and water flow rate data from the inlet pump 304 and/or the water flow meter 308. Further, the irrigation prescription module 205 may preferably manage the water flow rate at a constant level (i.e. 500 gpm) while maintaining the water pressure at the sprayers 322, 324 at their rated level (i.e. 30 psi) as discussed further below.

According to a further preferred embodiment, the irrigation prescription module 205 may preferably interface with the controller 302 to provide updated drive instructions to the various drive control systems 316 of the irrigation system 300. Still further, the irrigation prescription module 205 may preferably further interface with one or more valve controllers 314 to control valves 310, 312 which adjust water application rates by the sprayers 322, 324.

Figure 4:
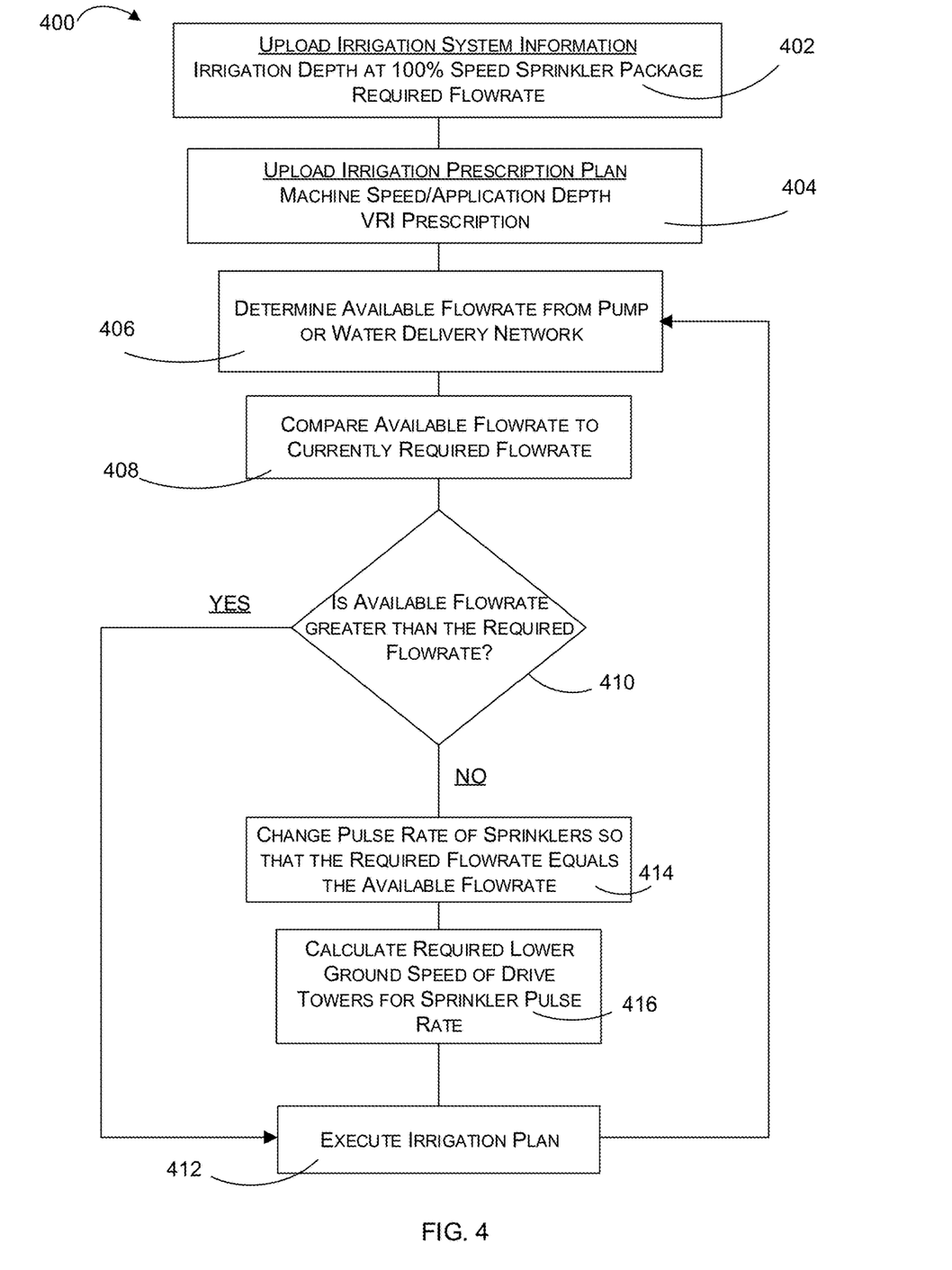
FIG. 4 shows a flow chart illustrating a method in accordance with a first preferred embodiment of the present invention.

With reference now to FIGS. 3 and 4, a first exemplary method 400 for use with the system of the present invention will now be further discussed. As shown in FIG. 4, at a first step 402, the system receives and stores irrigation system information. Preferably, the stored irrigation information may preferably include the sprinkler specifications, required flow rates, application depth at 100%, and minimum pressure requirements of the sprinkler package and/or irrigation machine. In a next step 404, the system preferably receives and stores an irrigation plan to be executed. The irrigation plan may be as simple as a percent of speed, or target application depth, or as complex as an individual sprinkler variable rate irrigation prescription. In a next step 406, the operator or system may preferably determine the flow rate of applicant available to the irrigation machine. In a next step 408, the system preferably compares the available flowrate to the currently required flowrate based on at least one of the following: sprinkler package required flowrate, current pulse rate, current ground speed reduction, and VRI prescription. At a next step 410, the system preferably determines if the available flowrate is greater than the required flowrate. If so, at a next step 412, the system then executes the irrigation plan. If not, at a next step 414, the system preferably adjusts the pulse rate of the system sprinklers to maintain the required flow rate needed by the machine. At a next step 416, the system then calculates and selects a lower ground speed required to match the irrigation prescription (i.e. the amount of applicant required) for the target area. Accordingly, the system may preferably select a ground speed which delivers the target amount of a given applicant at the selected pulse rate for the sprinklers. In an alternate preferred embodiment, the pulse rate and/or machine ground speed may be adjusted by the ratio of Available Flow Rate divided by the Required Flow Rate.

Once selected, at a next step 412, the system preferably then executes the irrigation plan. Once execution of the irrigation plan 412 begins, the system preferably continuously monitors the available and required flowrates 406, 408 and adjusts the pulse rate and machine speed as necessary to ensure the required machine flowrate always equals or is less than the available flow rate, thus ensuring that the actual application depth meets the target application depth. In addition to, or in lieu of, adjusting the ground speed, the present system may adjust other machine/prescription parameters such as (but not limited to): target area, irrigation times, watering rate, start angles, end angles, inner sprinkler radius, and outer sprinkler radius. According to alternative preferred embodiments, the system of the present invention may preferably also (or alternatively) adjust the mixture rates of one or more applicants in response to any of the above VRI prescription adjustments and/or based on the Available Flow Rate to Required Flow Rate ratio.

Figure 5:
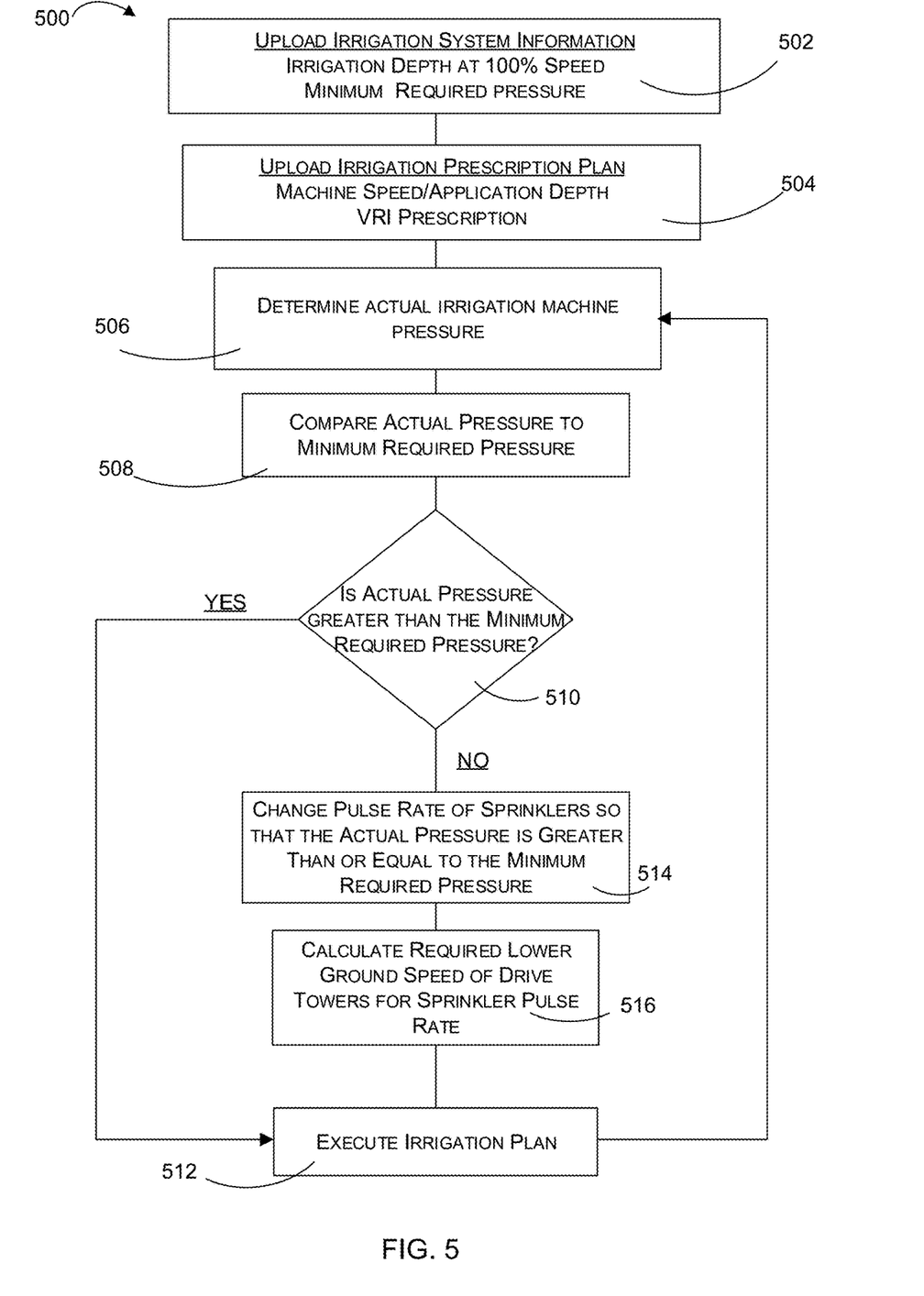
FIG. 5 shows a flow chart illustrating a method in accordance with a second preferred embodiment of the present invention

With reference now to FIG. 5, a further alternative embodiment of the present invention shall now be discussed in which the flow rate is adjusted based on the measured pressure(s) of the irrigation system. As discussed further below, this relationship may be pre-calculated and stored as a look-up table of flow rate adjustments based on measured pressures. According to further aspects of the present invention, this relationship preferably allows the use of water pressure alone to determine and adjust flow rates. Hence pressure measurements may be used instead of flow rate measurements to compensate for reductions in available flow rates and/or variations between available and required flow rates.

With reference now to FIGS. 3 and 5, a second exemplary method 500 for use with the system of the present invention will now be further discussed. As shown in FIG. 5, at a first step 502, the system receives and stores irrigation system information. Preferably, the stored irrigation information may preferably include the sprinkler specifications, required flow rates, application depth at 100%, and minimum pressure requirements of the sprinkler package and/or irrigation machine. In a next step 504, the system preferably receives and stores an irrigation plan to be executed. The irrigation plan may be as simple as a percent of speed, or target application depth, or as complex as an individual sprinkler variable rate irrigation prescription.

In a next step 506, the operator or system determines the actual (measured) pressure of applicant in the irrigation pipe. In a next step 508, the system preferably compares the minimum required pressure to the actual pressure. At a next step 510, the system preferably determines if the actual pressure is greater than the minimum required pressure for the sprinklers. If so, at a next step 512, the system then executes the irrigation plan. If not, at a next step 514, the system preferably adjusts the pulse rate of the system sprinklers to maintain the required pressure needed by the machine. At a next step 516, the system then calculates and selects a lower ground speed required to match the irrigation prescription (i.e. the amount of applicant required) for the target area. Accordingly, the system will preferably select a ground speed which delivers the target amount of a given applicant at the selected pulse rate for the sprinklers.

Once selected, at a next step 512 the system preferably then executes the irrigation plan. Once execution of the irrigation plan begins, the system preferably continuously monitors the actual irrigation machine pressure 506 and adjusts the pulse rate and machine speed as necessary to ensure the actual machine pressure always equals or exceeds the minimum required pressure, thus ensuring the actual application depth meets the target application depth.

Figure 6:
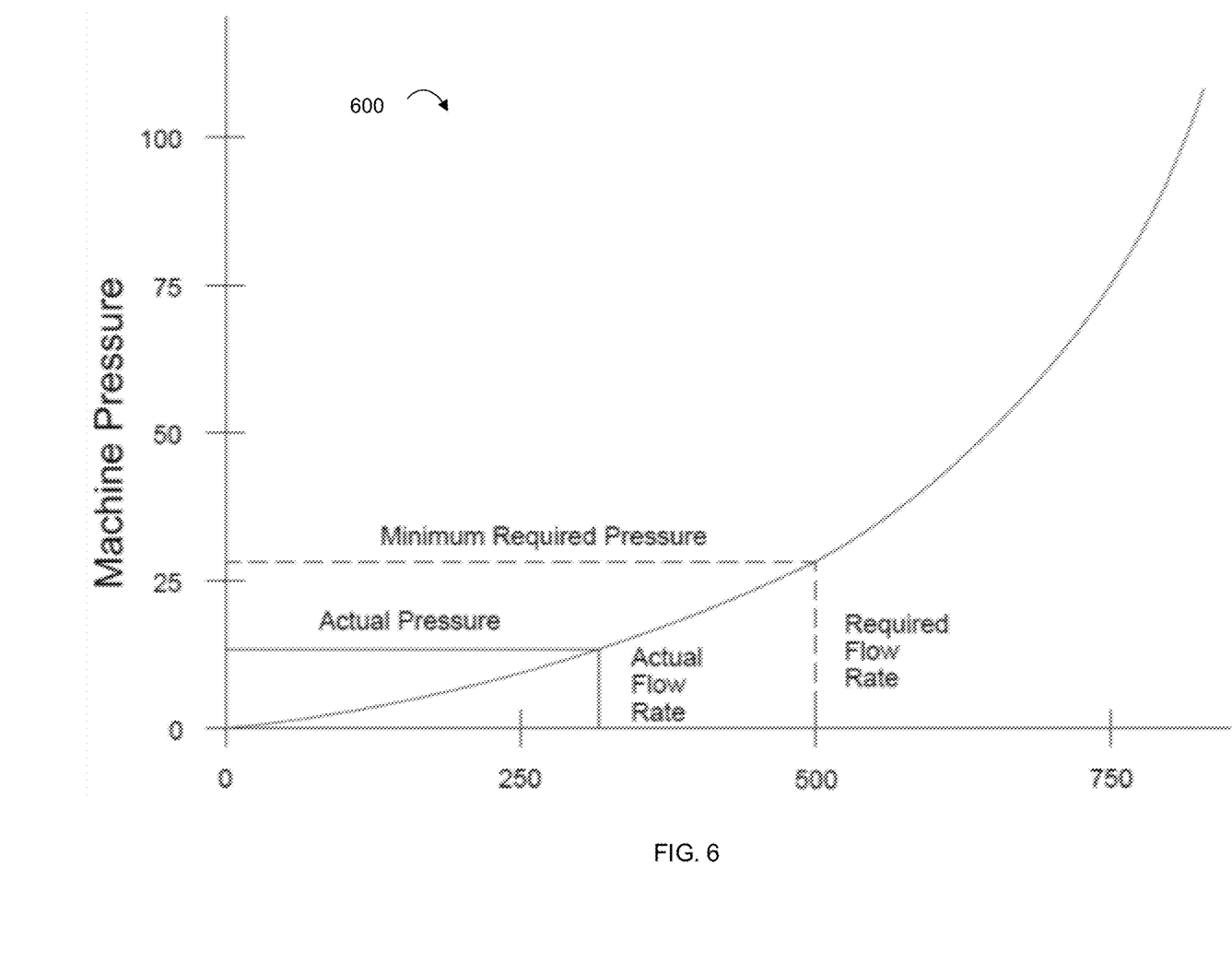
FIG. 6 shows a chart illustrating the relationship between irrigation machine pressure and flowrate.

In an alternate preferred embodiment, the pulse rate and machine ground speed may preferably be adjusted by the ratio of Available Water Pressure divided by the Required Water Pressure. This ratio may preferably be calculated utilizing the flowrate to pressure relationship shown in FIG. 6 (either via an equation or look-up table) to translate pressures to and from flow rates.

As discussed above, by employing the exemplary methods of the present invention, a target application depth can be achieved along with the required minimum pressure even where the available flow rate varies or is less than the required minimum flow rate required by a sprinkler package. This allows, for example, use of a sprinkler package rated for a flow rate exceeding the available flow rate. According to alternative preferred embodiments, an irrigation system employing the present invention may further maintain a constant flow rate even as the target application depth of a given irrigation prescription varies.

While the above descriptions regarding the present invention contain much specificity, these should not be construed as limitations on the scope, but rather as examples. Many other variations are possible. For example, the aspects of the first and second exemplary methods could be combined in a variety of ways to achieve the same results. Accordingly, the scope should be determined not by the embodiments illustrated, but by the appended claims and their legal equivalents.

What is claimed is:

1. A method for providing a constant flow rate within an irrigation system, wherein the method comprises:
receiving and storing irrigation system information, wherein the irrigation system information comprises sprinkler specifications;
receiving and storing an irrigation plan to be executed, wherein the irrigation plan comprises a target amount of an applicant to be applied to a target area;
determining an Available Flow Rate (AVR) for the irrigation system during execution of the irrigation plan;
determining a Required Flow Rate (RFR) from at least one data source selected from the group of data sources comprising: sprinkler package required flowrate, prescribed pulse rate, current ground speed, prescribed ground speed, and VRI prescription parameters;
comparing the Available Flow Rate of the irrigation system to the Required Flow Rate to determine whether the Available Flow Rate (AVR) is greater than or equal to the Required Flow Rate (RFR);
adjusting the pulse rate of a plurality of nozzles to reduce the Required Flow Rate (RFR) to at least the Available Flow Rate (AFR);
wherein the pulse rate is reduced by the ratio of $$\frac{AVR}{RFR};$$

and
calculating and selecting a lower ground speed required to apply the target amount of applicant to the target area based on the adjusted pulse rate for the plurality of nozzles.

2. The method of claim 1, wherein the irrigation system information comprises data selected from the group of data comprising: sprinkler specifications, flow rates and pressure requirements.

3. The method of claim 2, wherein the irrigation system information comprises sprinkler specifications.

4. The method of claim 3, wherein the irrigation system information comprises detected flow rates.

5. The method of claim 1, wherein the sprinkler specifications comprise: nozzle ratings and nozzle flow rates.

6. The method of claim 5, wherein the lower ground speed is determined by reducing a first ground speed by the ratio of $$\frac{AVR}{RFR}.$$

7. The method of claim 6, wherein the method further comprises the step of:
executing the irrigation plan;
continuously monitoring the Available Flow Rate (AVR) and the Required Flow Rate (RFR) during execution of the irrigation plan; and
updating the ratio of $$\frac{AVR}{RFR}.$$

8. The method of claim 7, wherein the method further comprises the step of detecting ground speed.

9. The method of claim 8, wherein the method further comprises the step of adjusting the pulse rate of the plurality of nozzles based on detected changes in ground speed.

10. The method of claim 8, wherein the method further comprises:
determining an Available Pressure (AP) for the irrigation system during execution of the irrigation plan;
determining a Minimum Required Pressure (MRP) from at least one data source selected from the group of data sources comprising: sprinkler package required flowrate, prescribed pulse rate, current ground speed, prescribed ground speed, and VRI prescription parameters;
comparing the Available Pressure of the irrigation system to the Minimum Required Pressure to determine whether the Available Pressure is greater than or equal to the Minimum Required Pressure;
adjusting the pulse rate of a plurality of nozzles to reduce the Minimum Required Pressure (MRP) to at least the Available Pressure (AP);
wherein the pulse rate is reduced by the ratio of $$\frac{AP}{MRP};$$

and
calculating and selecting a lower ground speed required to apply the target amount of applicant to the target area based on the adjusted pulse rate for the plurality of nozzles.

11. A method for providing a constant flow rate within an irrigation system, wherein the method comprises:
receiving and storing irrigation system information, wherein the irrigation system information comprises sprinkler specifications;
receiving and storing an irrigation plan to be executed, wherein the irrigation plan comprises a target amount of an applicant to be applied to a target area;
determining an Available Pressure (AP) for the irrigation system during execution of the irrigation plan;
determining a Minimum Required Pressure (MRP) from at least one data source selected from the group of data sources comprising: sprinkler package required flowrate, prescribed pulse rate, current ground speed, prescribed ground speed, and VRI prescription parameters;
comparing the Available Pressure of the irrigation system to the Minimum Required Pressure to determine whether the Available Pressure is greater than or equal to the Minimum Required Pressure;
adjusting the pulse rate of a plurality of nozzles to reduce the Minimum Required Pressure (MRP) to at least the Available Pressure (AP);

wherein the pulse rate is reduced by the ratio of $$\frac{AP}{MRP};$$

and calculating and selecting a lower ground speed required to apply the target amount of applicant to the target area based on the adjusted pulse rate for the plurality of nozzles.

12. The method of claim 11, wherein the irrigation system information comprises data selected from the group of data comprising: sprinkler specifications, flow rates and pressure requirements.

13. The method of claim 12, wherein the irrigation system information comprises sprinkler specifications.

14. The method of claim 13, wherein the irrigation system information comprises detected flow rates.

15. The method of claim 11, wherein the sprinkler specifications comprise: nozzle ratings and nozzle flow rates.

16. The method of claim 15, wherein the lower ground speed is determined by reducing a first ground speed by the ratio of $$\frac{AP}{MRP}.$$

17. The method of claim 16, wherein the method further comprises the step of:

executing the irrigation plan;

continuously monitoring the Available Pressure (AP) and the Minimum Required Pressure (MRP) during execution of the irrigation plan; and updating the ratio of $$\frac{AP}{MRP}.$$

18. The method of claim 17, wherein the method further comprises the step of detecting ground speed.

19. The method of claim 18, wherein the method further comprises the step of adjusting the pulse rate of the plurality of nozzles based on detected changes in ground speed.

* * * * *